3,355,391
TRICHLOROTRIFLUOROETHANE WATER EMULSION SYSTEM

Bernhardt Joseph Eiseman, Jr., Wilmington, Del., assignor to E. I. du Pont de Nemours and Company, Wilmington, Del., a corporation of Delaware
No Drawing. Filed Nov. 3, 1964, Ser. No. 408,683
2 Claims. (Cl. 252—153)

The present invention is directed to a novel emulsion of trichlorotrifluoroethane, water and isopropylammonium dodecylbenzenesulfonate to which has been added a small amount of nitromethane and propargyl alcohol to significantly stabilize the system against reaction of zinc metal. Basically, the emulsion system consists of from 0.25 to 50% water, from 0.1 to 45% of isopropylammonium dodecylbenzenesulfonate and at least 30% by weight of trichlorotrifluoroethane. This emulsion is useful for cleaning soiled metals and in particular, business machines. It has been found to be quite useful commercially for removing any soils which are either oil or water soluble from the surface of metals. Unexpectedly, it has been found that this emulsion system reacts fairly rapidly with zinc metal. Since zinc metal, particularly as coatings on ferrous metals, is quite important industrially, this reactivity greatly limits the usefulness of this emulsion system.

It is, therefore, an object of this invention to provide a means for modifying the emulsion system herein described to prevent the reaction of said system with zinc metal surfaces.

These and other objects of the invention will be apparent from the following description and claims.

More specifically, the present invention is directed to an emulsion system consisting essentially of (A) from 0.25 to 50% water, (B) from 0.1 to 45% of isopropylammonium dodecylbenzenesulfonate, (C) at least 30% by weight of trichlorotrifluoroethane, (D) from 0.10 to about 1.2% by weight nitromethane and (E) from about 0.01 to 0.5% by weight propargyl alcohol, the total of said nitromethane and said propargyl alcohol being less than 1.25% by weight.

It is well known that halogenated hydrocarbons will react with zinc metal. Indeed, reaction of trichlorotrifluoroethane with zinc is used industrially for the manufacture of chlorotrifluoroethylene. The use of nitromethane to stabilize halogenated hydrocarbons is known from a number of sources. U.S. Patent 3,085,116 discloses stabilizing trichlorotrifluoroethane against reaction with alcohols and polyols with nitromethane. U.S. Patent 2,567,621 and Canadian Patent 481,203 disclose stabilizing trichloroethylene and similar compounds against reaction with metals with nitroaliphatic compounds. British Patent 773,187 discloses stabilizing halomethanes against reaction with metals with both alkyl and aryl nitro compounds. British Patent 765,522 discloses stabilizing haloaliphatic compounds against reaction with metals using mixtures of nitroalkanes and dialkoxy substituted phenols. U.S. Patent 2,775,624 discloses stabilizing tetrachloroethylene with propargyl alcohol. Similarly, U.S. Patent 2,803,676 discloses stabilizing trichloroethylene using mixtures of propargyl alcohol and pyrrole.

The present novel emulsion system achieves unexpected results compared to the prior art in that in addition to stabilization against reaction with zinc, prevention of layer separation and the formation of the flocculation white solid is also achieved. While the prior art does teach that both the propargyl alcohol and nitromethane will prevent reaction with metals, none of the prior art teaches or suggests that a combination of nitromethane and propargyl alcohol prevents all three heretofore described phenomena as observed with the present emulsion system.

The emulsion compositions herein described are extremely useful as a metal cleaning medium; however, prior to this invention, said emulsions reacted with zinc surfaces. In addition to corroding the zinc surface, this reaction causes the formation of a white solid in the emulsion and the separation of layers due to deemulsification. Dissolving large quantities of inorganic salts in the emulsion will cause layer separation. The reaction with zinc undoubtedly produces inorganic salts which are probably responsible for both the white solids and the layer separation. It is, of course, undesirable to use a cleaning medium which will attack the metal being cleaned. As zinc is widely used industrially as an anti-corrosive surface coating, it is highly desirable, therefore, that this basic emulsion system be modified to prevent such reaction with zinc. It has now been discovered that the addition of 0.10 to 1.2% nitromethane and 0.01% to 0.5% propargyl alcohol to the basic emulsion system herein described effectively and unexpectedly prevents the reaction of said emulsion with zinc. It is necessary that the total quantity of these two materials added be less than 1.25% of the total composition as greater amounts tend to cause the emulsion system to separate. When less than 0.10% nitromethane or less than 0.01% propargyl alcohol are used, the desired effects are not obtained.

Prior to this invention, when the basic emulsion system is allowed to stand in contact with a zinc metal surface, three phenomena are observed, namely the zinc surface is corroded, flocculation of a white solid occurs in the liquid system, and formation of several layers takes place. These three phenomena do not necessarily occur simultaneously. Addition of the nitromethane and propargyl alcohol effectively prevents the occurrence of all three phenomena. It has been found, however, that prevention of the three phenomena from occurring is not equally readily accomplished. Addition of merely nitromethane to the emulsion system will prevent reaction with zinc for long periods of time, but not separation of layers or the flocculation of the white solid. Addition of propargyl alcohol only effectively prevents the formation of the flocculation white solid, but has little or no effect on multi-layers formation or the corrosion of zinc metal. In order to prevent all three phenomena from occurring, it is essential that nitromethane and propargyl alcohol be utilized as herein described.

In determining the useful concentrations of the two additives, the basic consideration is the useful life of the emulsion system thus obtained. It has been found that proper concentrations of nitromethane alone will prevent corrosion and layer separation for 60 days or more, but will prevent flocculation only for about five days. Any concentrations of propargyl alcohol, on the other hand, will not prevent layer separation or zinc corrosion for more than about ten days. Ten days is too short a time for most industrial applications. At least 20 days and preferably 50 days or more are necessary for industrial use of the present cleaning emulsions. When the mixtures contain nitromethane and/or propargyl alcohol concentrations below the defined limits, stabilities of ten days or less were obtained which is too little. When both additives are present within the defined limits of concentrations, complete stabilities of 50 days or more are obtained and zinc corrosion is effectively prevented for 160 days.

The compositions of this invention are useful for the same purposes as the basic emulsion compositions herein described. There is an important exception however; the compositions containing propargyl alcohol have a tendency to react slowly in some manner not yet understood with copper surfaces. Therefore, if it is desired to clean surfaces containing copper and no zinc metal is present, it is preferable to use the basic composition rather than those of the present invention. Where no copper is present and/or zinc metal is present, it is preferred to use the compositions of this invention to the basic emulsion compositions. The present novel emulsion system may be used in cleaning applications. Cleaning with the emulsions of this invention is preferably carried out using ultrasonic cleaning apparatus as is the case with the basic emulsion system.

The primary utility for the herein defined emulsions is cleaning machinery, particularly business machines such as typewriters, adding machines, desk calculators and the like. The emulsions remove both oil and water soluble soils and stains. These emulsions are also useful for cleaning pay telephones and particularly the coin operated mechanisms therein. The emulsions remove oils, greases, and other oily materials, dried ink and the like as well as the corrosion products of metals and other water soluble materials. The emulsions do not attack plastic and rubber parts in the electro motors, wires, platens and the like. Furthermore, they do not attack paints, lacquers and other surface coatings. Cleaning is carried out by contacting the machinery with the emulsion usually by immersing the machine in the emulsion. More rapid cleaning is obtained if agitation is supplied. A particularly useful and rapid form of cleaning involves the use of ultrasonic vibration. Ultrasonic cleaning devices are well known in the art. Cleaning is usually followed by a brief rinsing with trichloritrifluoroethane. The cleaned machine usually dries in a few seconds after rinsing.

The emulsions of this invention are useful for drying machinery parts including metallic, plastic and other parts without requiring physical drying techniques such as heating and the like. Emulsions which are well below their saturation point are particularly useful for this purpose. If only drying is desired, the metal or other part can be treated with a solution consisting of isopropylammonium dodecylbenzenesulfonate in 1,2,2-trichloro-1,2,2-trifluoroethane. The water on the surface of the metal combines with the solution to form an emulsion. A rinse with trichlorotrifluoroethane than leaves the surface essentially dry.

Representative examples further illustrating the present invention follow.

EXAMPLE I

The following example illustrates the effect that adding nitromethane and propargyl alcohol has on zinc corrosion, separation of layers and flocculation. In this example, an emulsion containing 2% isopropylammonium dodecylbenzenesulfonate, 6% water and 92% 1,2,2-trichlorotrifluoroethane was used as the basic emulsion system. To this were added varying amounts of either nitromethane, propargyl alcohol or both. These emulsions were then stored in contact with zinc at 100° F. (38° C.) and the effect on corrosion of zinc, separation of layers and flocculation of white solid observed. The results obtained are indicated in the table below. In this table, the days at 100° F. required for flocculation to occur, layers to separate or zinc corrosion to become visually evident are indicated.

TABLE I

| Concentration of Inhibitors, Weight Percent | | | Days at 100° F. to— | | |
|---|---|---|---|---|---|
| Nitromethane | Propargyl Alcohol | Total | Flocculation | Multi-layers | Zinc Corrosion |
| 1.0 | 0.3 | 1.3 | 80 | 1 | 200 |
| 0.3 | 0.15 | 0.45 | 50 | 60 | 200 |
| 0.15 | 0.07 | 0.22 | 80 | 130 | 160 |
| 0.075 | 0.035 | 0.110 | 7 | 80 | 76 |
| 0 | 0 | 0 | 1 | 2 | 1 |
| 1.0 | 0 | 1.0 | 1 | 60 | 200 |
| 0.3 | 0 | 0.3 | 1 | 60 | 200 |
| 0.15 | 0 | 0.15 | .5 | 50 | 160 |
| 0 | 0.1 | 0.1 | 60 | 4 | 4 |
| 0 | 0.3 | 0.3 | 60 | 8 | 16 |

¹ None visible.

From the preceding table it is readily apparent that all three phenomena occur quite rapidly when neither nitromethane or propargyl alcohol are present. It is also apparent that nitromethane alone will prevent zinc corrosion but has little or no effect on flocculation. Propargyl alcohol, on the other hand, effectively prevents flocculation but has little or no effect on layer separation or zinc corrosion. The combination of the two effectively prevents all three phenomena. The table also illustrates that exceeding 1.25% total additives is detrimental due to layer separation.

EXAMPLE II

To illustrate the differences between the stabilized emulsion system of the present invention and a non-stabilized system, two ultrasonic cleaning devices were set up. The first contained an emulsion of 6% by weight water and 2.5% by weight isopropylammonium dodecylbenzenesulfonate in 91.5% trichlorotrifluoroethane. The second emulsion contained in addition 0.15% nitromethane and 0.07% by weight propargyl alcohol. Identical soiled zinc samples were placed in each device and then subjected to ultrasonic cleaning for five minutes followed by 30 minutes standing with no agitation. These cycles were repeated and two layers appeared in the unstabilized emulsion after the ninth cycle. After 15 cycles, the stabilized system was still unaffected and the zinc samples remained clean and bright.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. An emulsion system consisting essentially of a basic composition containing, by weight, 0.25 to 50% water, 0.1 to 45% isopropylammonium dodecylbenzenesulfonate and at least 30% 1,1,2-trichloro-1,2,2-trifluoroethane, and, as inhibitors, 0.15% nitromethane and 0.07% propargyl alcohol, based on the basic composition.

2. An emulsion system consisting essentially of a basic composition containing, by weight, 6% water, 2% isopropylammonium dodecylbenzenesulfonate and 92% 1,1,2-trichloro-1,2,2-trifluoroethane, and, as inhibitors, 0.15% nitromethane and 0.07% propargyl alcohol, based on the basic composition.

References Cited

UNITED STATES PATENTS

| 3,042,479 | 7/1962 | Lawrence et al. | 252—171 X |
| 3,085,116 | 4/1963 | Kvalnes. | |
| 3,090,818 | 5/1963 | Long | 252—171 X |
| 3,105,779 | 10/1963 | Bulat | 134—1 |
| 3,159,582 | 12/1964 | Sims | 252—153 |
| 3,189,552 | 6/1965 | Sims | 252—153 |

FOREIGN PATENTS

| 582,455 | 9/1959 | Canada. |

LEON D. ROSDOL, *Primary Examiner.*

ALBERT T. MEYERS, *Examiner.*

B. BETTIS, *Assistant Examiner.*